United States Patent
Zhang et al.

(10) Patent No.: US 12,453,352 B2
(45) Date of Patent: Oct. 28, 2025

(54) FOSTHIAZATE PESTICIDE FORMULATIONS

(71) Applicant: Dow Global Technologies LLC, Midland, MI (US)

(72) Inventors: Shiling Zhang, Shanghai (CN); Ling Zhong, Shanghai (CN); Xuedong Gao, Shanghai (CN); Hua Ren, Shanghai (CN); Cuilan Chang, Shanghai (CN); Xuemei Zhai, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 531 days.

(21) Appl. No.: 17/788,934

(22) PCT Filed: Mar. 27, 2020

(86) PCT No.: PCT/CN2020/081784
§ 371 (c)(1),
(2) Date: Jun. 24, 2022

(87) PCT Pub. No.: WO2021/189447
PCT Pub. Date: Sep. 30, 2021

(65) Prior Publication Data
US 2023/0040947 A1    Feb. 9, 2023

(51) Int. Cl.
*A01N 57/32* (2006.01)
*A01N 25/02* (2006.01)
*A01P 7/04* (2006.01)

(52) U.S. Cl.
CPC .............. *A01N 57/32* (2013.01); *A01N 25/02* (2013.01); *A01P 7/04* (2021.08)

(58) Field of Classification Search
CPC ...... A01P 5/00; A01P 7/00; A01P 7/04; A01N 25/02; A01N 25/04; A01N 25/28; A01N 57/32
See application file for complete search history.

(56) References Cited

U.S. PATENT DOCUMENTS

| | | | |
|---|---|---|---|
| 5,866,153 A | 2/1999 | Hasslin et al. | |
| 10,377,647 B2 | 8/2019 | Jessop et al. | |
| 2002/0025986 A1* | 2/2002 | Rodham | C09K 23/018 516/98 |
| 2006/0252648 A1* | 11/2006 | Bell | A01N 25/04 504/359 |
| 2010/0226950 A1* | 9/2010 | Wilson | A01N 25/10 424/408 |
| 2012/0207807 A1 | 8/2012 | Wujek et al. | |
| 2017/0369386 A1 | 12/2017 | Dave et al. | |
| 2019/0373884 A1 | 12/2019 | Ren et al. | |

FOREIGN PATENT DOCUMENTS

| | | |
|---|---|---|
| CN | 102771475 A | 11/2012 |
| CN | 102907424 A | 2/2013 |
| CN | 103027051 A | 4/2013 |
| CN | 104054700 A | 9/2014 |
| CN | 104145988 | 11/2014 |
| CN | 104145988 A | 11/2014 |
| CN | 105660627 A | 6/2016 |
| CN | 105660690 A | 6/2016 |
| CN | 106857653 * | 6/2017 |
| CN | 109452304 A | 3/2019 |
| CN | 110856486 A | 3/2020 |
| EP | 2462805 A1 | 6/2012 |
| FR | 2187226 | 1/1974 |
| WO | 2006062835 A2 | 6/2006 |
| WO | 2018032389 A1 | 2/2018 |

OTHER PUBLICATIONS

Ixom (Safety Data Sheet, 2016). (Year: 2016).*
CN 106857653, English translation, 2017 (Year: 2017).*
Agropages (Agropages, Oct. 31, 2018) (Year: 2018).*
Ma Tao et al., Preparation of Fosthiazate 10% CS and Control Efficacy on Tomato Root-knot Agrochemicals, 2016, No. 4, vol. 55, Abstract.

* cited by examiner

*Primary Examiner* — Umamaheswari Ramachandran
(74) *Attorney, Agent, or Firm* — Arthur R. Rogers

(57) ABSTRACT

A method of making a formulation may include a step of forming a mixture comprising: a hydrotrope, a surfactant, a water-immiscible solvent, an isocyanate monomer, a salt, fosthiazate and water. Further, a step of adding an amine to the mixture to polymerizing the isocyanate monomer may be performed.

5 Claims, No Drawings

FOSTHIAZATE PESTICIDE FORMULATIONS

BACKGROUND

Field of the Invention

The present disclosure generally relates to pesticide formulations, and more specifically, to pesticide formulations comprising fosthiazate.

Introduction

Fosthiazate is a widely used pesticide due to its effectiveness in controlling nematodes, aphids, mites, thrips, and the like. However, fosthiazate has a distinct and foul smell in addition to being toxic through inhalation and skin exposure. Relative to other pesticides, fosthiazate has a high-water solubility of 9.85 g/L in water at 25° C.

Interfacial polymerization has been used to encapsulate pesticides. Interfacial polymerization is employed in formulations comprising an emulsion of an oil phase within an aqueous phase. During interfacial polymerization a polymeric shell is formed at an interface between the oil and water phases thereby encapsulating the oil phase. Pesticides having a low water solubility and high oil solubility are dissolved within the oil phase and the oil phase is mixed with the aqueous phase. Interfacial polymerization is then employed to encapsulate the pesticide containing oil phase within the polymeric shells.

Pesticides capable of being encapsulated using interfacial polymerization are traditionally limited to those pesticides having a low water solubility because encapsulating pesticides having a high-water solubility using interfacial polymerization presents a number of challenges. First, the high-water solubility of such pesticides means that a portion of the pesticide will be in the aqueous phase during the interfacial polymerization. Pesticide presence in the aqueous phase during interfacial polymerization results in less pesticide being encapsulated (i.e., less than 80 wt % of the pesticide being encapsulated). Second, high water-soluble pesticides tend to migrate across the interface of the oil and aqueous phases. The migration of the high-water soluble pesticides tends to decrease the strength of the polymeric shell. Relatively weaker polymeric shells are more prone to rupture under stress thereby releasing the oil phase and decrease stability of the resulting emulsion. CN104054700A provides for the encapsulation and separation of fosthiazate through interfacial polymerization but requires pH and temperature control of the polymerization. Further the polymeric shells are weak due to the migration of fosthiazate across the oil-water interface during polymerization and ultimately rely on curing to strengthen the shells. The pH and temperature control in addition to the curing add extra cost and complexity to the disclosure of CN104054700A.

"Salting-out" is a common technique for controlling the solubility of a compound within aqueous phases. U.S. Ser. No. 10/377,647B2 explains that salting-out is a method in which a salt is added to an aqueous solution that includes a dissolved moderately hydrophobic compound. In salting-out, the compound or material either precipitates (forms a new solid phase), creams out (forms a new liquid phase) or partitions into a pre-existing hydrophobic liquid phase. The high ionic strength of the aqueous phase due to the addition of the salt also affects the solubility of other compounds in the aqueous phase. The relatively high concentration salts used in salting-out techniques tends to precipitate surfactants and/or dispersants leading to emulsion instability. As such, salting-out is not a technique employed emulsions.

The ability of an emulsion to remain stable though a variety of temperatures and times is affected by the type of adjuvants used, the total amount of adjuvants present within the aqueous phase and the relative ionic strength of the adjuvants. For example, incorporation of high ionic strength salts can precipitate dispersants and emulsifiers resulting in the instability of the emulsion. In emulsions comprising encapsulated phases, precipitation of dispersants can lead to flocculation of the encapsulated phase and eventual precipitation.

Accordingly, it would be surprising to discover a mixture including an encapsulated oil phase where 80 wt % or greater of fosthiazate in the emulsion is encapsulated and the mixture is stable under accelerated stability testing at 54° C. for two weeks.

BRIEF SUMMARY OF THE INVENTION

The present invention offers a solution to forming a mixture comprising an encapsulated oil phase where 80 wt % or greater of fosthiazate in the mixture is encapsulated and the emulsion is stable under accelerated stability testing at 54° C. for two weeks.

The present invention is a surprising result of discovering that hydrotropes can be utilized to stabilize emulsified formulations while employing the salting-out technique. Specifically, that hydrotropes can be used to stabilize an oil-in-water emulsion while salting-out fosthiazate. Such a discovery is advantageous in that the salting-out increases the concentration of fosthiazate within the oil phase, while the hydrotrope stabilizes the oil-in-water emulsion such that the fosthiazate can be encapsulated through interfacial polymerization. The present invention is a surprising discovery because the incorporation of salts would be expected to precipitate surfactants and/or dispersants leading to breaking of the emulsion and no interfacial polymerization, but with the addition of the hydrotrope greater than 80 wt % of the fosthiazate can be encapsulated.

According to a first feature of the present disclosure, a method of making a formulation may include steps of (1) forming a mixture comprising a hydrotrope, a surfactant, a water-immiscible solvent, an isocyanate monomer, a salt, fosthiazate and water; and (2) adding an amine to the mixture to polymerizing the isocyanate monomer may be performed.

According to a second feature of the present disclosure, the fosthiazate is from 20 wt % to 35 wt % based on a total weight of the formulation.

According to a third feature of the present disclosure, the water-immiscible solvent is from 10 wt % to 30 wt % based on a total weight of the formulation.

According to a fourth feature of the present disclosure, the surfactant is from 0.5 wt % to 2.5 wt % based on a total weight of the formulation.

According to a fifth feature of the present disclosure, the hydrotrope is selected from the group consisting of dipotassium 2-(3-methylphenoxy)ethyl phosphate, sodium cumene sulfonate, sodium xylene sulfonate or combinations thereof.

According to a sixth feature of the present disclosure, the salt comprises a halogen anion and is from 0.4 mol % to 1.6 mol % of the formulation.

According to a seventh feature of the present disclosure, the salt comprises a sulfate anion and is from 0.03 mol % to 0.08 mol % based on the total moles of the formulation.

According to an eighth feature of the present disclosure, wherein the hydrotrope is from 2.5 wt % to 7.5 wt % based on a total weight of the formulation.

According to a ninth feature of the present disclosure, a formulation, comprises: 2.5 wt % to 7.5 wt % hydrotrope based on a total weight of the formulation, 20 wt % to 35 wt % fosthiazate based on a total weight of the formulation, 10 wt % to 30 wt % water-immiscible solvent based on the total weight of the formulation, 0.5 wt % to 2.5 wt % surfactant based on the total weight of the formulation, 0.03 mol % to 1.6 mol % salt based on the total moles of the formulation, water; and the reaction product of an isocyanate monomer and an amine.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All ranges include endpoints unless otherwise stated. Subscript values in polymer formulae refer to mole average values for the designated component in the polymer.

As used herein, the chemical abstracts service registry (CAS) number of a compound refers to the unique numerical identifier assigned by the Chemical Abstracts Service to a chemical substance described in the open scientific literature.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

As used herein, a "wt %" or "weight percent" or "percent by weight" of a component, unless specifically stated to the contrary, is based on the total weight of the composition or article in which the component is included. As used herein, all percentages are by weight unless indicated otherwise.

Formulation

The present disclosure is directed to a method of forming a formulation. The method of making the formulation comprises a step of formation of a mixture. The mixture comprises a hydrotrope, a surfactant, a water-immiscible solvent, an isocyanate monomer, a salt, fosthiazate and water. The water of the mixture is the balance of the rest of the components. The method of making the mixture also comprises a step of adding an amine to the mixture to polymerizing the isocyanate monomer. As will be explained in greater detail below, the polymerization of the isocyanate monomer forms a plurality of capsules that encapsulate a portion of the fosthiazate. The capsules are composed of the reaction product of the isocyanate monomer and the amine.

The present disclosure is also directed to a formulation. The formulation comprises a hydrotrope, a surfactant, a water-immiscible solvent, a salt, fosthiazate, water and the reaction product of an isocyanate monomer and an amine.

Hydrotrope

The formulation comprises a hydrotrope. As used herein, a 'hydrotrope" is a compound that solubilizes hydrophobic compounds in aqueous solutions by means other than micellar solubilization and does not undergo spontaneous self-aggregation. The hydrotrope is selected from the group consisting of dipotassium 2-(3-methylphenoxy)ethyl phosphate, sodium cumene sulfonate, sodium xylene sulfonate, urea, tosylate, nicotinamide, caffeine, sodium benzonate, para amino benzoic acid, N, N-dimethyl urea or combinations thereof.

The formulation comprises 2.5 wt % or greater, or 3.0 wt % or greater, or 3.5 wt % or greater, or 4.0 wt % or greater, or 4.5 wt % or greater, or 5.0 wt % or greater, or 5.5 wt % or greater, or 6.0 wt % or greater, or 6.5 wt % or greater, or 7.0 wt % or greater, while at the same time, 7.5 wt % or less, or 7.0 wt % or less, or 6.5 wt % or less, or 6.0 wt % or less, or 5.5 wt % or less, or 5.0 wt % or less, or 4.5 wt % or less, or 4.0 wt % or less, or 3.5 wt % or less, or 3.0 wt % or less based on a total weight of the formulation.

Salt

The formulation comprises a salt. As defined herein, a "salt" is a compound comprising an ionic bond between at least one anion and at least one cation. The anions may have a valence of −1 less, or −2 or less, or −3 or less. The anions may comprise group 16 and group 17 (i.e., halogens) elements. The anions may comprise oxygen, sulfur, selenium, tellurium, fluorine, chlorine, bromine, iodine, sulfate ($SO_4$), carbonate ($CO_3$), nitrate ($NO_3$), acetate ($CH_3COO$), phosphate ($PO_4$), tetraborate ($B_4O_7$) and combinations thereof. The cation may have a valence of +1, +2 or +3. The cation may comprise group 1, group 2 or group 13 elements. The cation may comprise lithium, sodium, potassium, rubidium, beryllium, magnesium, calcium, strontium, boron, aluminum, gallium, indium, copper, zinc, silver, ammonium ($NH_4$) and combinations thereof. Examples of salts that may be used in the formulation include NaCl, KCl, $K_2SO_4$, $(NH_4)_2SO_4$ and combinations thereof.

The formulation may comprise 0.4 wt % or greater, or 0.6 wt % or greater, or 0.8 wt % or greater, or 1.0 wt % or greater, or 1.2 wt % or greater, or 1.4 wt % or greater, or 1.6 wt % or greater, or 1.8 wt % or greater, or 1.0 wt % or greater, or 1.2 wt % or greater, or 1.4 wt % or greater, or 1.6 wt % or greater, or 1.8 wt % or greater, or 2.0 wt % or greater, or 2.2 wt % or greater, or 2.4 wt % or greater, or 2.6 wt % or greater, or 2.8 wt % or greater, or 3.0 wt % or greater, or 3.2 wt % or greater, or 3.4 wt % or greater, or 3.6 wt % or greater, or 3.8 wt % or greater, or 4.0 wt % or greater, or 4.2 wt % or greater, or 4.4 wt % or greater, or 4.6 wt % or greater, or 4.8 wt % or greater, or 5.0 wt % or greater, or 5.2 wt % or greater, or 5.4 wt % or greater, or 5.6 wt % or greater, or 5.8 wt % or greater, or 6.0 wt % or greater, or 6.2 wt % or greater, or 6.4 wt % or greater, or 6.6 wt % or greater, or 6.8 wt % or greater, or 7.0 wt % or greater, or 7.2 wt % or greater, or 7.4 wt % or greater, or 7.6 wt % or greater, or 7.8 wt % or greater, or 8.0 wt % or greater, or 8.2 wt % or greater, or 8.4 wt % or greater, or 8.6 wt % or greater, or 8.8 wt % or greater, or 9.0 wt % or greater, or 9.2 wt % or greater, or 9.4 wt % or greater, or 9.6 wt % or greater, or 9.8 wt % or while at the same time, 10 wt % or less, or 9.8 wt % or less, or 9.6 wt % or less, or 9.4 wt % or less, or 9.2 wt % or less, or 9.0 wt % or less, or 8.8 wt % or less, or 8.6 wt % or less, or 8.4 wt % or less, or 8.2 wt % or less, or 8.0 wt % or less, or 7.8 wt % or less, or 7.6 wt % or less, or 7.4 wt % or less, or 7.2 wt % or less, or 7.0 wt % or less, or 6.8 wt % or less, or 6.6 wt % or less, or 6.4 wt % or less, or 6.2 wt % or less, or 6.0 wt % or less, or 5.8 wt % or less, or 5.6 wt % or less, or 5.4 wt % or less, or 5.2 wt % or less, or 5.0 wt % or less, or 4.8 wt % or less, or 4.6 wt % or less, or 4.4 wt % or less, or 4.2 wt % or less, or 4.0 wt % or less, or 3.8 wt % or less, or 3.6 wt % or less, or 3.4 wt % or less, or 3.2 wt % or less, or 3.0 wt % or less, or 2.8 wt % or less, or 2.6 wt % or less, or 2.4 wt % or less, or 2.2 wt % or less, or 2.0 wt % or less, or 1.8 wt % or less, or 1.6 wt % or less, or 1.4 wt % or less, or 1.2 wt % or less, or 1.0 wt % or less, or 0.8 wt % or less, or 0.6 wt % or less of salt based on a total weight of the formulation.

The formulation may comprise 0.03 mol % or greater, or 0.04 mol % or greater, or 0.05 mol % or greater, or 0.06 mol % or greater, or 0.07 mol % or greater, or 0.1 mol % or greater, or 0.2 mol % or greater, or 0.3 mol % or greater, or 0.4 mol % or greater, or 0.5 mol % or greater, or 0.6 mol % or greater, or 0.7 mol % or greater, or 0.8 mol % or greater, or 0.9 mol % or greater, or 1.0 mol % or greater, or 1.1 mol % or greater, or 1.2 mol % or greater, or 1.3 mol % or greater, or 1.4 mol % or greater, or 1.5 mol % or greater, while at the same time, 1.6 mol % or less, or 1.5 mol % or less, or 1.4 mol % or less, or 1.3 mol % or less, or 1.2 mol % or less, or 1.1 mol % or less, or 1.0 mol % or less, or 0.9 mol % or less, or 0.8 mol % or less, or 0.7 mol % or less, or 0.6 mol % or less, or 0.5 mol % or less, or 0.4 mol % or less, or 0.3 mol % or less, or 0.2 mol % or less, or 0.1 mol % or less, 0.08 mol % or less, or 0.07 mol % or less, or 0.06 mol % or less, or 0.05 mol % or less, or 0.04 mol % or less of the salt based on the total moles of the formulation.

Surfactant

The formulation comprises a surfactant. As used herein, a "surfactant" is an amphiphilic compound that comprises both hydrophobic moiety and a hydrophilic moiety such that its introduction into biphasic systems results in the lowering of surface tension between the components of the biphasic system. The surfactant may be selected from the group consisting of polyalkylene glycol monobutyl ether, sodium; 4-(4-dodecoxysulfonylphenoxy)benzenesulfonate, disodium, 5-[(6-sulfonatonaphthalen-1-yl)methyl]naphthalene-2-sulfonate, 2-methyloxirane; oxirane and combinations thereof.

The formulation may comprise 0.5 wt % or greater, or 0.6 wt % or greater, or 0.7 wt % or greater, or 0.8 wt % or greater, or 0.9 wt % or greater, or 1.0 wt % or greater, or 1.1 wt % or greater, or 1.2 wt % or greater, or 1.3 wt % or greater, or 1.4 wt % or greater, or 1.5 wt % or greater, or 1.6 wt % or greater, or 1.7 wt % or greater, or 1.8 wt % or greater, or 1.9 wt % or greater, or 2.0 wt % or greater, or 2.1 wt % or greater, or 2.2 wt % or greater, or 2.3 wt % or greater, or 2.4 wt % or greater, while at the same time, 2.5 wt % or less, or 2.4 wt % or less, or 2.3 wt % or less, or 2.2 wt % or less, or 2.1 wt % or less, or 2.0 wt % or less, or 1.9 wt % or less, or 1.8 wt % or less, or 1.7 wt % or less, or 1.6 wt % or less, or 1.5 wt % or less, or 1.4 wt % or less, or 1.3 wt % or less, or 1.2 wt % or less, or 1.1 wt % or less, or 1.0 wt % or less, or 0.9 wt % or less, or 0.8 wt % or less, or 0.7 wt % or less, or 0.6 wt % or less, of the surfactant based on the total weight of the formulation.

Solvent

The formulation comprises a water-immiscible solvent. As used herein, the term "Water-Immiscible" is defined to mean that the solvent cannot be added to water at a concentration greater than 5 wt % of the combined weight of the solvent and water at 23° C. without causing turbidity and/or separation in the resulting combination. The turbidity and/or separation is determined visually. The water-immiscible solvent may be selected from the group consisting of heavy aromatic petroleum-based solvents, naphtha (petroleum), xylene, toluene, paraffins, hexane, alkyl esters, ketones, aldehyde or ether, and combinations thereof.

The formulation comprises 10 wt % or greater, or 12 wt % or greater, or 14 wt % or greater, or 16 wt % or greater, or 18 wt % or greater, or 20 wt % or greater, or 22 wt % or greater, or 24 wt % or greater, or 26 wt % or greater, or 28 wt % or greater, while at the same time,
30 wt % or less, or 28 wt % or less, or 26 wt % or less, or 24 wt % or less, or 22 wt % or less, or 20 wt % or less, 18 wt % or less, or 16 wt % or less, or 14 wt % or less, or 12 wt % or less of solvent based on a total weight of the formulation.

Isocyanate Monomer and Amine

The present disclosure utilizes an isocyanate monomer and an amine. As used herein, an isocyanate monomer is a monomer comprising one or more isocyanate moieties that will effectively copolymerize with isocyanate monomers and other monomers. Isocyanate monomers have the structure of equation 1:

$$R-(N=C=O)_x \qquad (Eq. 1)$$

wherein R is an organic compound and x is 1 or 2. The isocyanate monomer may be selected from the group consisting of diphenylmethane diisocyanate, condensates of toluene diisocyanate and a polyol, methylene diphenyl diisocyanate, polymeric methylene diphenyl diisocyanate, toluene diisocyanate, isophorone diisocyanate, other diisocyanates and combinations thereof.

The present disclosure involves the polymerization of the isocyanate monomers with the amine. As used herein, an amine is a compound or functional group that comprises a basic nitrogen atom with a lone electron pair. The amine is selected from the group consisting of ethylene diamine, triethylene tetraamine, 1,6-hexamethylenediamine, bis-hexamethylenetriamine, tetraethylenepentamine, polyamine and combinations thereof.

As will be explained in greater detail below, the amine and the isocyanate monomer are combined in an interfacial polymerization process. As such, the formulation may comprise the reaction product of the isocyanate monomer and the amine (i.e., a polymerized compound comprising derivatives of the isocyanate monomer and amine).

The formulation may comprise 0.1 wt % or greater, or 0.2 wt % or greater, or 0.3 wt % or greater, or 0.4 wt % or greater, or 0.5 wt % or greater, or 0.6 wt % or greater, or 0.7 wt % or greater, or 0.8 wt % or greater, or 0.9 wt % or greater, or 1.0 wt % or greater, or 1.1 wt % or greater, or 1.2 wt % or greater, or 1.3 wt % or greater, or 1.4 wt % or greater, while at the same time, 1.5 wt % or less, or 1.4 wt % or less, or 1.3 wt % or less, or 1.2 wt % or less, or 1.1 wt % or less, or 1.0 wt % or less, or 0.9 wt % or less, or 0.8 wt % or less, or 0.7 wt % or less, or 0.6 wt % or less, or 0.5 wt % or less, or 0.4 wt % or less, or 0.3 wt % or less, or 0.2 wt % or less of the amine based on the total weight of the formulation.

The formulation may comprise 2.0 wt % or greater, or 2.2 wt % or greater, or 2.4 wt % or greater, or 2.6 wt % or greater, or 2.8 wt % or greater, or 3.0 wt % or greater, or 3.2 wt % or greater, or 3.4 wt % or greater, or 3.6 wt % or greater, or 3.8 wt % or greater, or 4.0 wt % or greater, or 4.2 wt % or greater, or 4.4 wt % or greater, or 4.6 wt % or greater, or 4.8 wt % or greater, or 5.0 wt % or greater, or 5.2 wt % or greater, or 5.4 wt % or greater, or 5.6 wt % or greater, or 5.8 wt % or greater, while at the same time, 6.0 wt % or less, or 5.8 wt % or less, or
5.6 wt % or less, or 5.4 wt % or less, or 5.2 wt % or less, or 5.0 wt % or less, or 4.8 wt % or less, or 4.6 wt % or less, or 4.4 wt % or less, or 4.2 wt % or less, or 4.0 wt % or less, or 3.8 wt % or less, or 3.6 wt % or less, or 3.4 wt % or less, or 3.2 wt % or less, or 3.0 wt % or less, or 2.8 wt % or less, or 2.6 wt % or less, or 2.4 wt % or less, or 2.2 wt % or less of the isocyanate based on the total weight of the formulation.

Fosthiazate

The formulation comprises fosthiazate. The International Union of Pure and Applied Chemistry (IUPAC) name of fosthiazate 3-[butan-2-ylsulfanyl(ethoxy)phosphoryl]-1,3-thiazolidin-2-one. Fosthiazate is commercially available under the CAS number of 107534-96-3 from Sigma-Aldrich, St. Louis, MO, USA.

The formulation comprises 20 wt % or greater, or 21 wt % or greater, or 22 wt % or greater, or 23 wt % or greater, or 24 wt % or greater, or 25 wt % or greater, or 26 wt % or greater, or 27 wt % or greater, or 28 wt % or greater, or 29 wt % or greater, or 30 wt % or greater, or
31 wt % or greater, or 32 wt % or greater, or 33 wt % or greater, or 34 wt % or greater, while at the same time, 35 wt % or less, or 34 wt % or less, or 33 wt % or less, or 32 wt % or less, or 31 wt % or less, or 30 wt % or less, or 29 wt % or less, or 28 wt % or less, or 27 wt % or less, or 26 wt % or less, or 25 wt % or less, or 24 wt % or less, or 23 wt % or less, or 22 wt % or less, or 21 wt % or less of fosthiazate based on a total weight of the formulation.

Method

As stated above, the method includes a step of forming the mixture. The mixture can be formed by combining the fosthiazate, water-immiscible solvent and isocyanate monomer into an organic phase and the water, salt, surfactant and hydrotrope into an aqueous phase. The organic phase and the aqueous phase may then be combined to form the mixture. It will be understood that the mixture can be formed by adding the hydrotrope, surfactant, water-immiscible solvent, isocyanate monomer, salt, fosthiazate and water together in any order, but that the materials will tend to form the separate organic and aqueous phases. The mixture without the amine may be agitated, stirred, heated and/or cooled to form an emulsion of the organic phase within the aqueous phase. As stated above, the introduction of the salt decreases the solubility of the fosthiazate within the water such that the fosthiazate migrates into the organic phase. The isocyanate monomer, being hydrophobic, is present in the water-immiscible solvent of the organic phase.

Next the amine is added to the mixture. The amine is soluble in the water phase of the mixture. The addition of the amine results in the polymerization of the isocyanate monomer with the amine at the interface of the organic and aqueous phases thereby forming a capsule of polymer comprising derivates of the isocyanate monomer and amine around the organic phase. In other words, the capsule of polymer encapsulates a portion of the fosthiazate. The polymerization of the isocyanate monomers and amine forms a plurality of capsules in the mixture that encapsulate the solvent and the fosthiazate. The capsules are able to withstand 54° C. for 14 days without rupturing or undergoing flocculation.

The percentage of fosthiazate that is encapsulated (i.e., the Encapsulation Efficiency) by the capsules is 80% or greater, or 82% or greater, or 84% or greater, or 86% or greater, or 88% or greater, or 90% or greater, or 92% or greater, or 94% or greater, or 96% or greater, or 98% or greater, while at the same time, 100% or less, or 98% or less, or 96% or less, or 94% or less, or 92% or less, or 90% or less, or 88% or less, or 86% or less, or 84% or less, or 82% or less of the total amount of fosthiazate in the formulation as measured in accordance with the encapsulation efficiency description below.

EXAMPLES

Materials

Solvent is naphtha (petroleum) heavy aromatic solvent having a CAS number of 64742-94-5 and commercially available as SOLVESSO™ 150# from Exxon Mobil Co, Irving, TX, USA.

HYDRO1 is a mixture of 50 wt % water and 50 wt % poly(oxy-1,2-ethanediyl), alpha-phosphono-omega-(methylphenoxy)-, dipotassium salt having a CAS number of 66057-30-5 and commercially available from The Dow Chemical Company, Midland, MI, USA.

SCS is sodium cumene sulfonate having a CAS number of 15763-77-6 and commercially available from Shanghai D&B Biological Science and Technology Co. Ltd, Shanghai, China.

SXS is sodium xylene sulfonate having a CAS number of 1300-72-7 and commercially available from Sigma-Aldrich, St. Louis, MO, USA.

SL is Sodium lignosulfonate having a CAS number of 8061-51-6 and commercially available from Sigma-Aldrich, St. Louis, MO, USA.

SURF1 is polyalkylene glycol monobutyl ether having a 42 wt % of ethylene oxide as measured according to Nuclear Magnetic Resonance (NMR) Spectroscopy and having a CAS number of 9038-95-3. SURF1 is commercially available from The Dow Chemical Company, Midland, MI, USA.

SURF2 is sodium; 4-(4-dodecoxysulfonylphenoxy)benzenesulfonate having a CAS number of 119345-04-9. SURF2 is commercially available from The Dow Chemical Company, Midland, MI, USA.

SURF3 is 2-methyloxirane;oxirane and is commercially available from The Dow Chemical Company, Midland, MI, USA.

SURF4 is disodium; 5-[(6-sulfonatonaphthalen-1-yl)methyl]naphthalene-2-sulfonate having a CAS number of 9084-06-4 and is commercially available from The Dow Chemical Company, Midland, MI, USA.

NaCl is pure sodium chloride and is commercially available from Sigma-Aldrich, St. Louis, MO, USA.

KCl is pure potassium chloride and is commercially available from Sigma-Aldrich, St. Louis, MO, USA.

$K_2SO_4$ is pure potassium sulfate and is commercially available from Sigma-Aldrich, St. Louis, MO, USA.

$NH_4SO_4$ is pure ammonium sulfate and is commercially available from Sigma-Aldrich, St. Louis, MO, USA.

Fosthiazate is 3-[butan-2-ylsulfanyl(ethoxy)phosphoryl]-1,3-thiazolidin-2-one having a CAS number of 98886-44-3 and is commercially available from Sigma-Aldrich, St. Louis, MO, USA.

EDA is ethylene diamine having a CAS number of 107-15-3 and is commercially available from The Dow Chemical Company, Midland, MI, USA.

TETA is triethylenetetramine having a CAS number of 112-24-3 and is commercially available from Sigma-Aldrich, St. Louis, MO, USA.

HMDA is 1,6-hexamethylenediamine having a CAS number of 124-09-4 and is commercially available from Sigma-Aldrich, St. Louis, MO, USA.

ISO1 is diphenylmethane diisocyanate including isomers and homologues having a 30% NCO content and a CAS number of 9016-87-9. ISO1 is commercially available from The Dow Chemical Company, Midland, MI, USA.

ISO2: is a polyurethane prepolymer having an NCO content of 3.0% as determined by ASTM D 5155 and a viscosity at 23° C. of 12,000 mPa·s as determined by ASTM D 4889 and formed from the combination of Poly(oxy-1,2-ethanediyl), .alpha.-hydro-.omega.-hydroxy-, polymer with 1,3-diisocyanatomethylbenzene with toluene diisocyanate.

Sample Preparation

Prepare inventive examples (IE) and comparative examples (CE) by combining the indicated amount of fosthiazate with the solvent. Next, add the isocyanate monomer to the mixed fosthiazate and solvent to produce an organic phase. Agitate the organic phase through swirling until visually homogeneous. Prepare an aqueous phase comprising the indicated amount of surfactant(s), salt and water. Add the aqueous phase to the organic phase to produce a two-phase mixture. Emulsify by mixing at speed of 500 revolutions-per-minute on a FISHER SCIENTIFIC MAXIMA™ digital stirrer until 5-10 µm drop size of organic phase is obtained as determined by optical microscopy using a LEICA M125 microscope. Add the amine in a dropwise manner as a 10 wt % aqueous solution while stirring at a reduced speed. The addition of the amine solution begins the interfacial polymerization of the isocyanate monomer such that a plurality of capsules form encapsulating the organic phase. The capsules are suspended in the aqueous phase. Continue stirring the capsule laden mixture for one additional minute.

Test Methods

Accelerated Stability Testing: Accelerated stability testing is performed by placing 20 mL of the inventive and comparative examples in glass containers having a sealed lid and holding the inventive and comparative examples at 54° C. for two weeks in a THERMO Blue M oven.

Aggregation Testing: Aggregation of the capsules is measured by visually observing if clumping or flocculation of the capsules has occurred during the accelerated stability testing.

Encapsulation Efficiency Testing: Measure encapsulation efficiency using reverse phase high performance liquid chromatography (HPLC) coupled with a diode-array detection (DAD) detector. The HPLC is performed using a HPLC-UV Agilent Eclipse XDB-C18 machine with a DAD as detector (UV absorbance at 245 nm). A sample of the capsule suspension formulation (i.e., both the capsules and aqueous phase) is taken and the concentration of fosthiazate is measured via HPLC as outlined above. Next, the formulation is centrifuged for 20 minutes at speed of 15,000 revolutions-per-minute in a centrifuge to form separate capsule and aqueous phase layers. The layers are separately collected and the fosthiazate concentration in the aqueous phase is measured as outlined above. Encapsulation efficiency is calculated according to equation 2 below, wherein $W_1$ is fosthiazate content in the aqueous phase and $W_0$ is the fosthiazate content in whole capsule suspension:

$$\text{Encapsulation Efficiency (\%)} = \frac{(1 - W_1)}{W_0} * 100 \quad \text{(Eq. 2)}$$

Results

Tables 1 and 2 provide the composition of CE1-CE9 and IE1-IE11 as well as the results from accelerated stability testing, aggregation testing and encapsulation efficiency testing. The values of tables 1 and 2 are in wt % based on the total weight of the formulation unless otherwise indicated.

TABLE 1

| Material Type | Material | CE1 | CE2 | CE3 | CE4 | IE1 | IE2 | IE3 | IE4 | IE5 | IE6 | IE7 | CE5 | CE6 | CE7 |
|---|---|---|---|---|---|---|---|---|---|---|---|---|---|---|---|
| Solvent | Solvent | 22 | 16.99 | 15 | 22.5 | 21.95 | 15 | 15 | 15 | 22.6 | 15.5 | 23.68 | 23.3 | 15 | 15 |
| Hydrotrope | HYDRO1 | 4.88 | 5.66 | 5 | 5 | 4.87 | 5 | | | 5.02 | 5.18 | 5.26 | | 5 | 5 |
| | SCS | | | | | | | 5 | | | | | | | |
| | SXS | | | | | | | | 5 | | | | | | |
| Surfactant | SL | | 1.13 | 1 | 1 | 0.975 | 1 | | | 1 | 1 | 2.1 | 1 | 1 | 1 |
| | SURF1 | | 1.13 | 1 | | | 1 | | | 1 | 1 | | 1 | 1 | 1 |
| | SURF2 | 0.97 | 1.13 | 1 | 1 | 0.975 | 1 | 2 | 2 | 1 | | 1.05 | 1 | 1 | 1 |
| | SURF3 | 1.96 | | | 1 | 0.975 | | | | | | | | | |
| | SURF4 | | | | | | | 2 | 2 | | | | | | |
| Salt | NaCl | | | | 2.5 | 3.9 | | | | | | 8.94 | | | |
| | KCl | | 0.57 | 2.5 | | | 4 | 5 | 5 | 8.54 | 8.8 | | 8.8 | 10 | 12.5 |
| | K$_2$SO$_4$ | | | | | | | | | | | | | | |
| | (NH$_4$)$_2$SO$_4$ | | | | | | | | | | | | | | |
| Active | Fosthiazate | 24.44 | 33.98 | 30 | 25 | 24.39 | 30 | 30 | 30 | 22.6 | 31.1 | 23.68 | 23.3 | 30 | 30 |
| Amine | EDA | 0.25 | 0.34 | 0.3 | 0.25 | 0.24 | 0.3 | 0.5 | 0.5 | 0.45 | 0.3 | 0.47 | 0.5 | 0.3 | 0.3 |
| | TETA | | | | | | | | | | | | | | |
| | HMDA | | | | | | | | | | | | | | |
| Isocyanate | ISO1 | 2.45 | 5.66 | 5 | 1.7 | 1.65 | 5 | 5 | 5 | 5.03 | 3.6 | 5.26 | 5.18 | 5 | 5 |
| Monomer | ISO2 | | | | 0.8 | 0.78 | | | | | 1.6 | | | | |
| | Water | 43 | 33.4 | 39.2 | 39.25 | 39 | 37.7 | 35.5 | 35.5 | 32.66 | 30.5 | 29.47 | 35 | 31.7 | 29.2 |
| | Molar concentration of the salts | 0.00 | 0.08 | 0.34 | 0.43 | 0.67 | 0.54 | 0.67 | 0.67 | 1.15 | 1.20 | 1.53 | 1.19 | 1.34 | 1.68 |
| | Capsule Formation | N | N | N | N | Y | Y | Y | Y | Y | Y | Y | Y | Y | Y |
| | Aggregation | N | N | N | N | N | N | N | N | N | N | N | Y | 5 Days | Y |
| | Encapsulation Efficiency (%) | N/A | N/A | N/A | N/A | 82.8 | 91.0 | 87.1 | N/A | 93.2 | 94.3 | 95.7 | N/A | N/A | N/A |

TABLE 2

| Material Type | Material | IE8 | IE9 | IE10 | IE11 | CE8 | CE9 |
|---|---|---|---|---|---|---|---|
| Solvent | Solvent | 15 | 15 | 15 | 15 | 15 | 15 |
| Hydrotrope | HYDRO1 | 5 | 5 | 5 | 5 | 5 | 5 |
| | SCS | | | | | | |
| | SXS | | | | | | |

TABLE 2-continued

| Material Type | Material | IE8 | IE9 | IE10 | IE11 | CE8 | CE9 |
|---|---|---|---|---|---|---|---|
| Surfactant | SL | | | | | | |
| | SURF1 | | | | | | |
| | SURF2 | 2 | 2 | 2 | 2 | 2 | 2 |
| | SURF3 | | | | | | |
| | SURF4 | 2 | 2 | 2 | 2 | 2 | 2 |
| Salt | NaCl | | | | | | |
| | KCl | | | | | | |
| | $K_2SO_4$ | 1 | 1.25 | | | | 1.5 |
| | $(NH_4)_2SO_4$ | | | 0.5 | 0.5 | 1.5 | |
| Active | Fosthiazate | 30 | 30 | 30 | 30 | 30 | 30 |
| Amine | EDA | | | | | | |
| | TETA | 0.5 | | 0.5 | | 0.5 | 0.5 |
| | HMDA | | 1.25 | | 1 | | |
| Diisocyanate | ISO1 | 5 | 5 | 5 | 5 | 5 | 5 |
| | ISO2 | | | | | | |
| Water | | 38.5 | 37.5 | 39 | 38.5 | 37.5 | 38 |
| Molar concentration of the salts | | 0.06 | 0.07 | 0.04 | 0.04 | 0.12 | 0.09 |
| Capsule Formation | | Y | Y | Y | Y | Y | Y |
| Aggregation | | N | N | N | N | Y | Y |
| Encapsulation Efficiency (%) | | N/A | N/A | 93.3 | N/A | N/A | N/A |

As can be seen from Table 1, CE1-CE4 did not form capsules and therefore failed to encapsulate the fosthiazate. It is believed that the salt concentration was not sufficient to migrate the fosthiazate into the solvent and as such interfacial polymerization was unable to form capsules. Unlike CE1-CE4, IE1-IE7 demonstrate a wide variety of salt types, salt concentrations, hydrotropes and surfactants that can be employed to form capsules that are not only durable enough to withstand accelerated stability testing, but also prevent aggregation of the capsules during testing. Further, all of IE1-IE7 demonstrated greater than 80% encapsulation efficiency with generally greater efficiency being gained for higher salt usage. CE5 demonstrates a similar composition to that of IE5 with the primary difference being the absence of a hydrotrope. Despite the compositional similarity, the lack of a hydrotrope in CE5 results in the flocculation and aggregation of the capsules during the accelerated stability testing. CE6 and CE7 are believed to have experienced capsule aggregation due to the excess presence of salt forcing the surfactant from solution with the aggregation of capsules for CE6 occurring after 5 days.

As can be seen from Table 2, the use of salts comprising a sulfate anion require less molar and weight percent salt to achieve the same capsule formation and encapsulation efficiency as the salts comprising a chlorine anion. Such an outcome is believed to occur due to the increased salting-out efficiency of sulfate anions as compared to chlorine anions.

What is claimed is:

1. A method of making a formulation, comprising the steps of:

forming a mixture comprising:
- a hydrotrope selected from one or more from the group consisting of dipotassium 2-(3-methylphenoxy)ethyl phosphate, sodium cumene sulfonate, and sodium xylene sulfonate and present at 2.5 wt % to 7.5 wt %;
- a surfactant;
- a water-immiscible solvent;
- an isocyanate monomer;
- a salt comprising a sulfate anion and present at 0.03 mol % to 0.08 mol % of the formulation;
- fosthiazate; and
- water; and adding an amine to the mixture to polymerizing the isocyanate monomer.

2. The method of claim 1, wherein the fosthiazate is from 20 wt % to 35 wt % based on a total weight of the formulation.

3. The method of claim 1, wherein the water-immiscible solvent is from 10 wt % to 30 wt % based on a total weight of the formulation.

4. The method of claim 1, wherein the surfactant is from 0.5 wt % to 2.5 wt % based on a total weight of the formulation.

5. A formulation, comprising:
- 2.5 wt % to 7.5 wt % hydrotrope selected from one or more from the group consisting of dipotassium 2-(3-methylphenoxy)ethyl phosphate, sodium cumene sulfonate, and sodium xylene sulfonate based on a total weight of the formulation;
- 20 wt % to 35 wt % fosthiazate based on a total weight of the formulation;
- 10 wt % to 30 wt % water-immiscible solvent based on the total weight of the formulation;
- 0.5 wt % to 2.5 wt % surfactant based on the total weight of the formulation;
- 0.03 mol % to 1.6 mol % salt comprising a sulfate anion;
- water; and
- the reaction product of an isocyanate monomer and an amine.

* * * * *